United States Patent

Servignat et al.

(10) Patent No.: US 8,931,370 B2
(45) Date of Patent: Jan. 13, 2015

(54) BICYCLE PEDAL OF THE AUTOMATIC ENGAGEMENT AND DISENGAGEMENT TYPE

(71) Applicant: Time Sport International, Vaulx-Milieu (FR)

(72) Inventors: Hervé Servignat, Sucieu (FR); Fabien Chappuis, La Tour du Pin (FR)

(73) Assignee: Time Sport International (FR)

( * ) Notice: Subject to any disclaimer, the term of this patent is extended or adjusted under 35 U.S.C. 154(b) by 121 days.

(21) Appl. No.: 13/718,154

(22) Filed: Dec. 18, 2012

(65) Prior Publication Data

US 2013/0186232 A1 Jul. 25, 2013

(30) Foreign Application Priority Data

Dec. 22, 2011 (FR) ...................................... 11 62277

(51) Int. Cl.
*B62M 3/08* (2006.01)

(52) U.S. Cl.
CPC ...................................... *B62M 3/086* (2013.01)
USPC ....................................................... 74/594.6

(58) Field of Classification Search
CPC ................................. B62M 3/08; B62M 3/086

USPC ................................. 74/594.4, 594.6; 36/131
See application file for complete search history.

(56) References Cited

U.S. PATENT DOCUMENTS

| 6,477,917 | B1 * | 11/2002 | Peyre et al. ................... 74/594.6 |
| 7,073,409 | B2 * | 7/2006 | Ho ................................ 74/594.6 |
| 2005/0061104 | A1 * | 3/2005 | Campagnolo ................ 74/594.6 |
| 2010/0005924 | A1 | 1/2010 | Servignat et al. |

FOREIGN PATENT DOCUMENTS

WO WO-2008129145 A1 10/2008

* cited by examiner

*Primary Examiner* — Thomas Diaz
(74) *Attorney, Agent, or Firm* — The Belles Group, P.C.

(57) ABSTRACT

A bicycle pedal with automatic engagement and disengagement includes a body (2) rotatable on a pedal axle (3) with: a front abutment (4) cooperating with a conjugate abutment surface (5) provided on a cleat (6) fixed to the sole of a shoe; a retaining member (9) rotatable about a geometrical axis (A) parallel to that of the pedal, adapted to be pressed against the cleat by a flexing element (B, 15) to attach the cleat to the pedal, one end (15a) of the flexing element being immobilized against the body (2), the other end (15b) being in bearing engagement against the retaining member. The articulation axle of the retaining member (9) includes a rod (13) that extends transversely under the flexing element (B, 15), which is in bearing engagement on said articulation axle, the flexing element functioning in flexion at three points.

10 Claims, 4 Drawing Sheets

BICYCLE PEDAL OF THE AUTOMATIC ENGAGEMENT AND DISENGAGEMENT TYPE

PRIORITY

Priority is claimed to French Application No. 11 62277, filed Dec. 22, 2011, the disclosure of which is incorporated herein by reference in its entirety.

FIELD OF THE INVENTION

The invention relates to a bicycle pedal with automatic engagement and disengagement, of the kind that includes a body rotatable on a pedal axle with:
- a front abutment means adapted to cooperate with a conjugate abutment surface provided on a cleat fixed to the bottom of the sole of the shoe of the user;
- a retaining member rotatable about a geometrical axis parallel to that of the pedal, adapted to be pressed against the cleat by a flexing element, to attach the cleat to the pedal, the mean longitudinal direction of the flexing element being orthogonal to the pedal axis, one end of the flexing element, being immobilized against the body, the other end being in bearing engagement against the retaining member.

BACKGROUND

A pedal of this type is known, notably from WO 2008/129 145, in the name of the applicant company.

SUMMARY OF THE INVENTION

Although a pedal conforming to that document proves entirely satisfactory, it is desirable to reduce its weight and to simplify its assembly, notably with a view to accelerating it.

According to the invention, a bicycle pedal of the kind defined above is characterized in that the articulation axle of the retaining member is constituted by a rod that extends transversely under the flexing element, which is in bearing engagement on said articulation axle, the flexing element functioning in flexion at three points.

The flexing element is advantageously retained by simple bearing engagement against the pedal body and against the retaining member, without being built in, and so assembly is easy and fast.

The rod forming the rotation axle of the retaining member preferably has in its median area adapted to come to bear against the flexing element flats distributed over its circumference and situated at different distances from the geometrical axis of the rod, so that by rotation of the rod in bearings provided in the pedal body it is possible to adjust the hardness of the return action exerted by the flexing element.

The pedal body may include two rearwardly extending extensions bracketing the retaining member and including the bearings for the rotation axle of this retaining member. The two extensions extending toward the rear of the body are separated by a free space with no crossmember.

The retaining member may be constituted by a generally U-shaped hoop having two radially oriented branches connected by a central part against which one end of the flexing element comes to bear.

The flexing element, is advantageously constituted by a flexing plate, in particular one made of composite material.

The pedal preferably includes a catch adapted to retain the retaining member in an open position on disengagement of the cleat against the return action exerted by the flexing element and to release this retaining member on engagement of the cleat.

This catch advantageously includes a leaf spring spring-loading it toward an open position. The leaf spring may be made of metal and moulded into the plastic material catch.

The catch may be the shape of a U and the ends of the branches of which remote from the crossmember provided with aligned outwardly oriented pins serving to articulate the catch to the pedal body.

BRIEF DESCRIPTION OF THE DRAWINGS

Apart from the features disclosed hereinabove, the invention consists in a certain number of other features that will be addressed more explicitly hereinafter in relation to an embodiment described with reference to the appended drawings, but that is in no way limiting on the invention. In these drawings.

DETAILED DESCRIPTION

Figure 1:
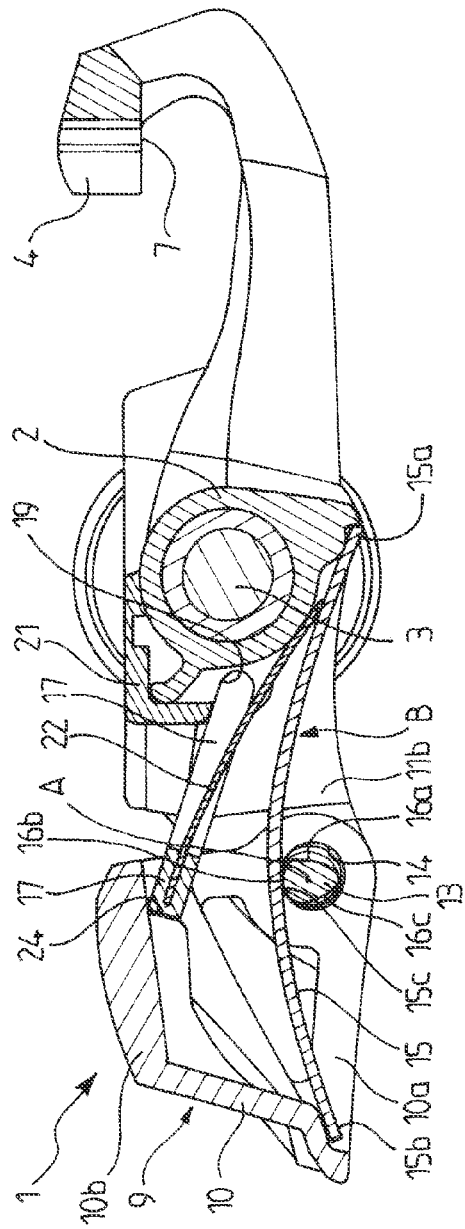
FIG. 1 is a view of a pedal of the invention in an open position, in vertical longitudinal section in a plane orthogonal to the axis of the pedal.

Referring to the drawings, there can be seen a bicycle pedal 1 with automatic engagement and disengagement. The pedal represented is intended to be mounted on the right-hand side of the bicycle. The left-hand pedal would be similarly constituted, symmetrically with respect to a vertical longitudinal plane.

Hereinafter, the terms "front" and "rear" are to be understood for a pedal in a horizontal position mounted on a bicycle and according to the normal direction of forward movement of the bicycle.

Figure 4:
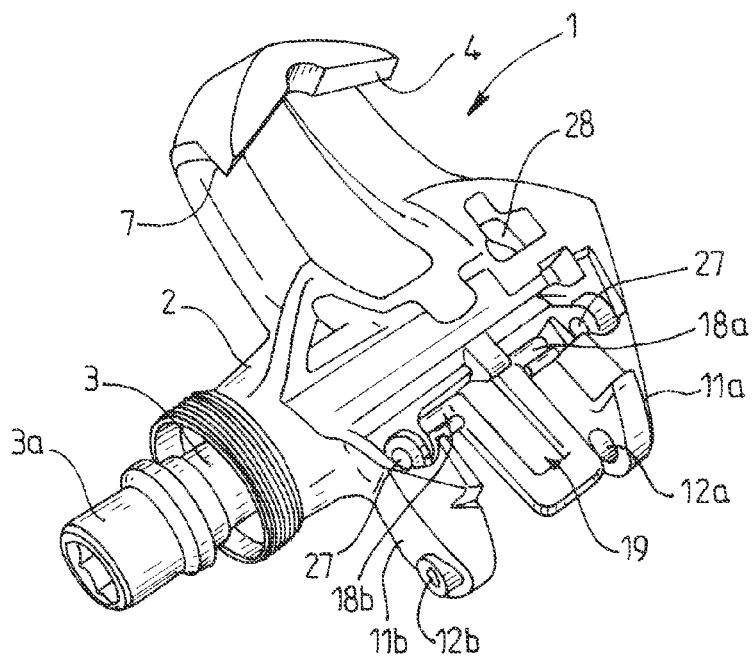
FIG. 4 is a perspective view from behind of the left-hand side of the pedal body and the catch, the other parts of the pedal having been removed, apart from the axle itself.
Figure 5:
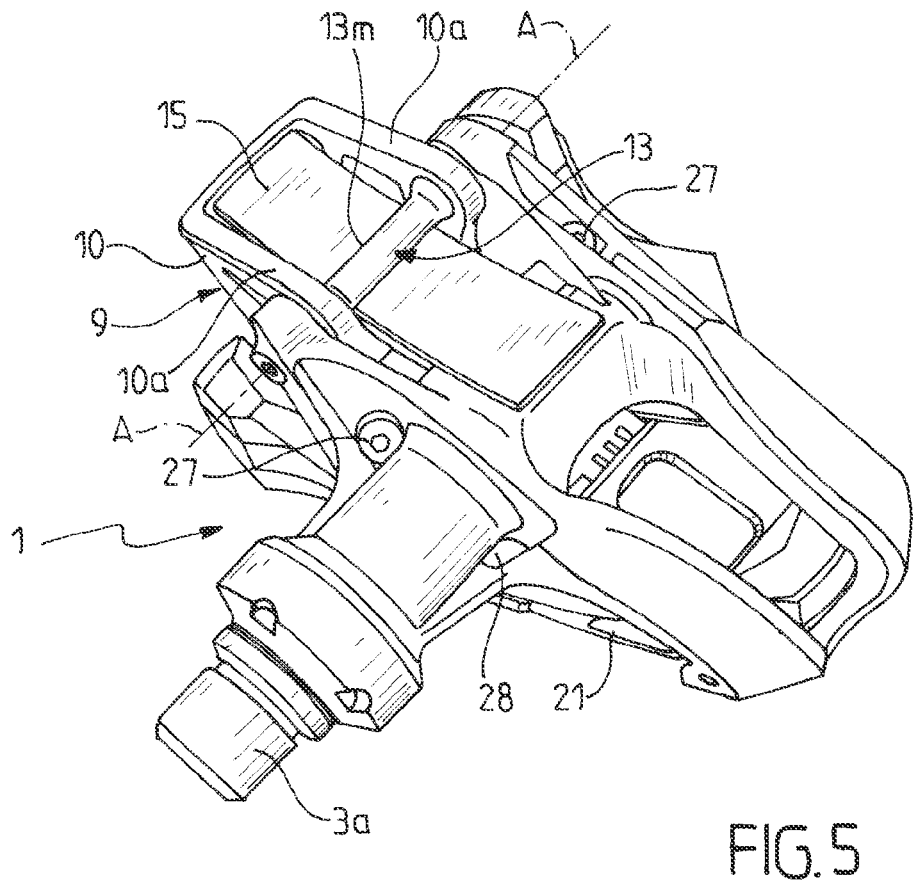
FIG. 5 is a perspective view from below of she complete pedal with a cleat, attached.

The pedal 1 includes a body 2 rotating on an axle 3 a part 3a (FIGS. 4 and 5) of which projects from one side of the body for the purpose of mounting it at the end of a crank.

The pedal 1 includes on at least one face of the body a front abutment means 4 adapted to cooperate with a conjugate abutment surface 5 provided on a cleat 6 fixed to the bottom of the sole S (FIG. 2) of the shoe of the cyclist. The cleat 6 includes a downwardly projecting part 6a forming a cam. The abutment 5 is constituted by the front face of the projection 6a.

A rim 7 situated at the front of the pedal forms a return toward the axle 3. A nose 8 provided at the front of the cleat 6 is engaged under the rim 7.

A retaining member 9 is rotatable about a geometrical articulation axis A parallel to the axis of the pedal. In the embodiment represented, the axis A is situated to the rear of the axle 3 of the pedal and lower than that axle when the pedal is horizontal. The retaining member 9 is advantageously constituted by a generally U-shaped hoop 10 the concave side of which faces downward and forward. This hoop has two branches 10a oriented radially relative to the geometrical axis of rotation of the hoop. The branches 10a are connected at the end opposite the geometrical articulation axis A by a part 10b forming a crossmember, the cross section of which can be seen in FIG. 2 and defines an obtuse angle, slightly greater than 90°.

Alternatively, the hoop 10 could be in front of the axle 3, with its concave side facing toward the rear.

The cam 6a would also he turned in the opposite direction.

The hoop 10 is inscribed within the rear of the pedal body comprising two extensions 11a, 11b (FIG. 3) that are not connected by any crossmember and between which there is a free space to receive the hoop 10. Each extension 11a, 11b includes, towards its end remote from the axle of the pedal, a bearing 12a, 12b. These two bearings are coaxial and adapted to receive cylindrical journals provided at the ends of a transverse rod 13 parallel to the axle of the pedal that constitutes the articulation axle of the retaining member 9 or hoop 10. The branches of the hoop 10 are preferably situated inside the space between the extensions 11a, 11b and are adjacent the internal faces of those extensions. Each branch of the hoop 10 includes a bore 14 (FIGS. 1 and 2) adapted to have the journals of the rod 13 pass through them and to be supported by the latter.

The retaining member 9 is adapted to be pressed against the rear of the cleat 6 by a flexing element B to attach the cleat 6 to the pedal, the mean longitudinal direction of the flexing element B being orthogonal to the axle 3 of the pedal. This flexing element B is advantageously constituted by a flexing blade 15, notably of rectangular shape, advantageously produced in a composite material. One end 15a of the flexing blade 15 is immobilized against the pedal body 2. This end 15a is advantageously in simple bearing engagement against the body, without being built into it, but preferably being received in a downwardly open imprint corresponding to its cross section to retain it laterally. The other end 15b of the flexing blade 15 is in simple bearing engagement against the lower edge of the hoop 10, which can also have a downwardly open imprint to accommodate this end 15b and retain it laterally.

The rod 13 forming the articulation axle of the hoop 10 extends under the flexing blade 15 that bears on this rod 13 at a point 15c between the two ends 15a, 15b.

The articulation rod 13 of the hoop 10 advantageously has in its median area 13m (FIG. 5) flats situated at different distances from the geometrical axis A of rotation of the hoop 10.

Figure 2:
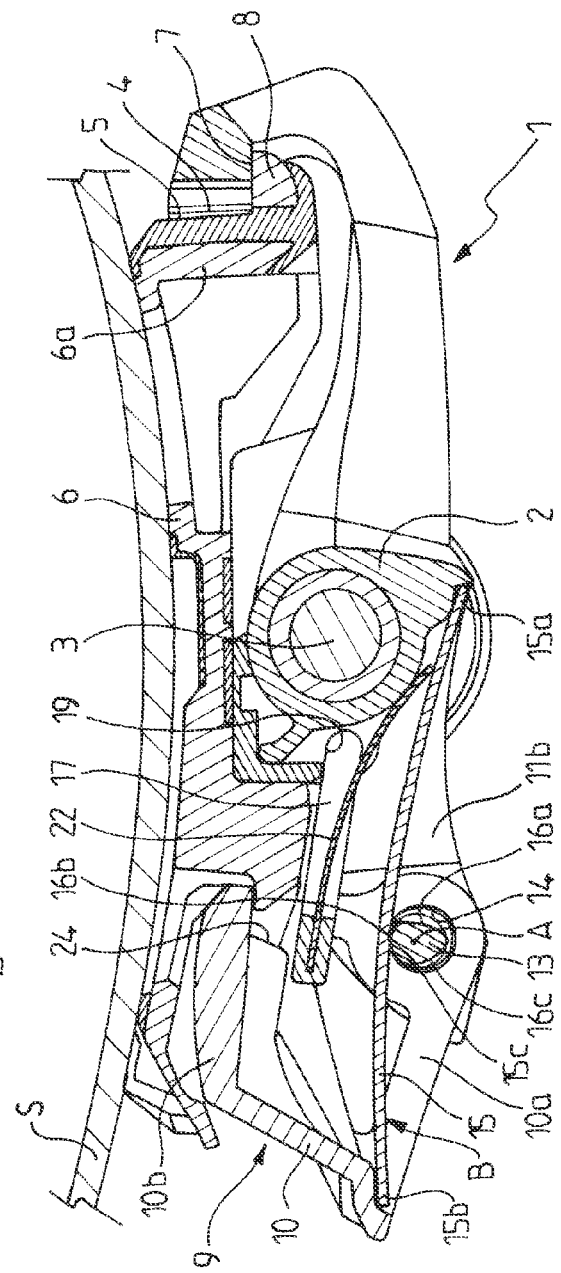
FIG. 2 shows the pedal in a similar way to FIG. 1 with a cleat attached, i.e. with the pedal in a closed position.
Figure 3:
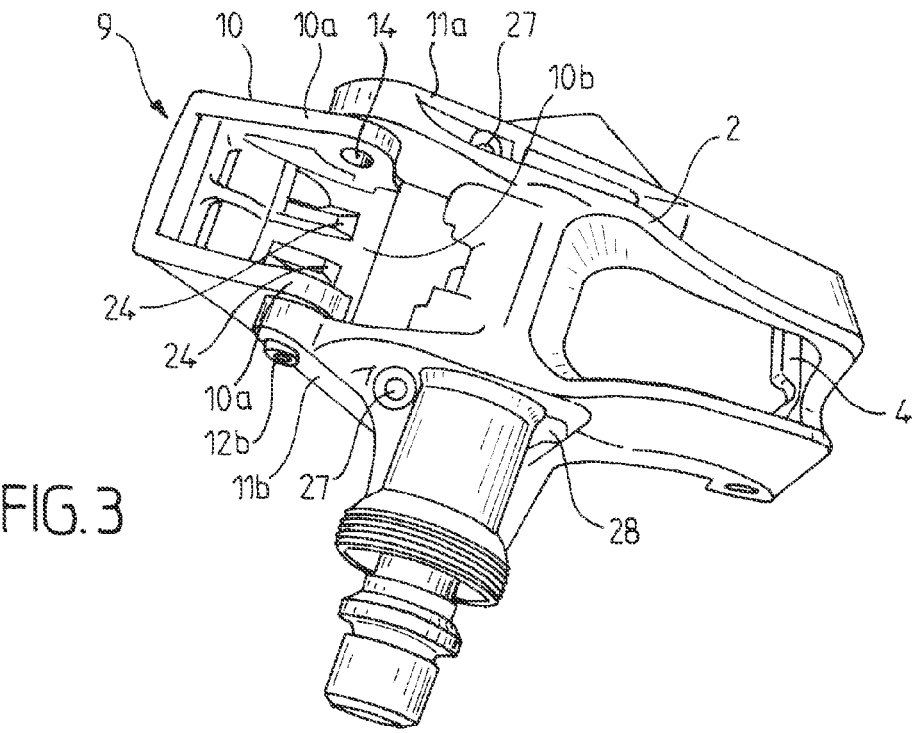
FIG. 3 is a perspective view from below of the pedal body and the retaining member, the other elements of the pedal having been removed.

In the example shown in FIGS. 1 and 2, the median area 13m includes three flats 16a, 16b, 16c, the configuration represented corresponding to that for which the flat 16b is in bearing engagement against the flexing blade 15. The term "flat" is to be understood in a broad sense as encompassing a plane surface portion as much as a curved surface portion with a radius of curvature greater than the radius of the rod 13 and the bore 14.

By rotation of the rod 13 in its end bearings 12a, 12b it is possible to adjust the hardness of the return action of the flexing blade 15, by modifying the distance from the bearing point of this blade to the geometrical axis A.

The rod 13 has, at one end at least, a groove or an imprint accessible from the outside with a tool to turn the rod 13 and adjust the hardness of the elastic return action of the hoop 10.

The pedal 1 further includes a catch 17 sensitive to disengagement and engagement of the cleat 6 with the pedal. The catch 17 is designed to retain the hoop 10 constituting the retaining member in the open position shown in FIG. 1 on disengagement of the cleat against the elastic return action of the flexing blade 15.

Figure 8:
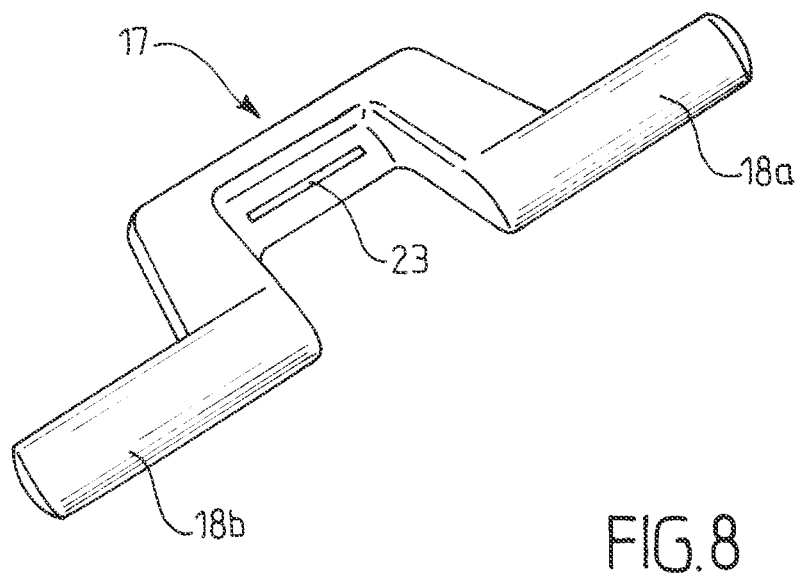
FIG. 8 is a perspective view of the catch.

The catch 17 produced in the form of a U (FIG. 8) the ends of the branches of which remote from the crossmember are provided with aligned and coaxial pins 18a, 18b projecting transversely outward. The pins 18a, 18b constitute the articulation axle of the catch relative to the pedal body 2. The pins 18a, 18b are received in part-cylindrical imprints 19 (FIGS. 1 and 2) provided in the pedal body to serve as bearings for rotation of the catch 17, which is disposed above the flexing blade 15.

Figure 7:
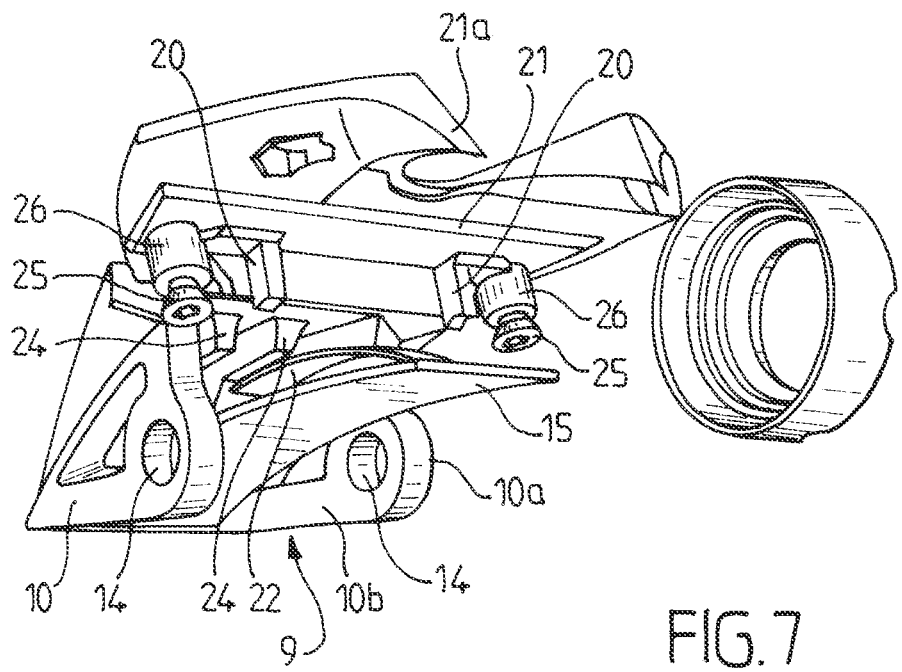
FIG. 7 is a perspective view from below of she retaining member, the platform, the flexing element and the leaf spring of the catch, which is not represented, nor is the pedal body, but to clarify the orientation a ring through which the axle of the assembled pedal passes is represented.

The pins 18a, 18b may be retained in the imprints 19 by downwardly projecting lugs 20 (FIG. 7) provided under a demountable platform 21.

The catch 17 is spring-loaded into she high locking position shown in FIG. 1 by a leaf spring 22 that bears at its front end against the lower part of the pedal body 2 as shown in FIGS. 1 and 2. The rear part of the leaf spring 22 is advantageously built into a slot 23 (FIG. 8) provided in the crossmember of the U-shaped part of the catch.

Abutments 24 (FIGS. 2 and 3) are provided under the crossmember of the hoop 10 to serve as bearing points for the catch 17 in the retaining position shown in FIG. 1.

The leaf spring 22 is advantageously made of metal and is moulded into the plastic material catch 17, being built into the slot 23. The blade 12 is in bearing engagement against the pedal body at the level of its other end. Alternatively, the blade 22 may be made of plastic material and may be moulded in one piece with the catch.

Figure 6:
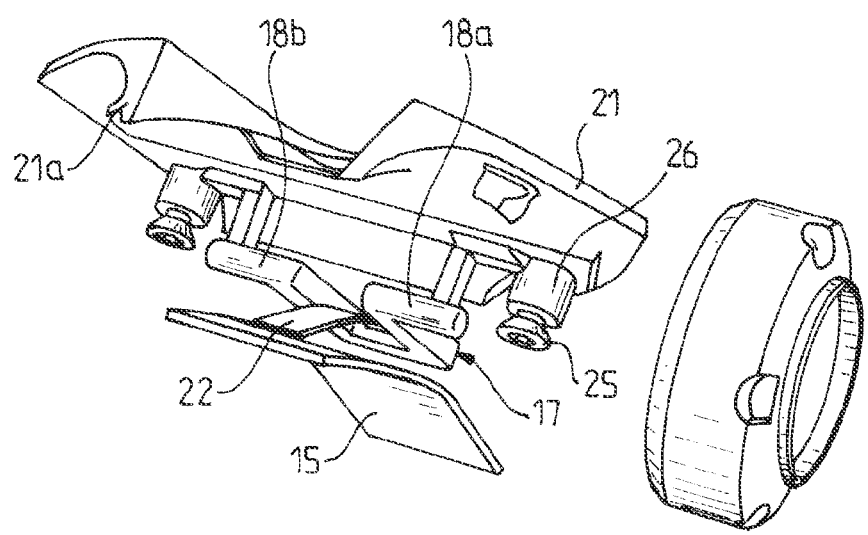
FIG. 6 is a perspective view of the flexing element, without the retaining member, of the catch with an overmoulded leaf spring and the bearing platform, without the pedal body, but to clarify the orientation a ring through which the axle of the assembled pedal passes is represented.

The platform 21 constitutes the upper bearing point of the pedal and is demountably fixed by means of screws 25 (FIGS. 6 and 7) received in internally threaded holes of sleeves 26 projecting under the platform, adapted to be engaged in holes 27 (FIG. 5) provided in the pedal body, to the rear of the pedal axle. Tongues 21a (FIGS. 6 and 7) for clipping the front part of the platform into the pedal body are provided to cooperate with orifices 28 (FIG. 5) situated in front of the axle of the pedal.

This platform 21 can be easily replaced when worn or if the user wishes to customize their equipment by choosing a particular platform from a choice of colours and/or materials.

The operation of the pedal is briefly described hereinafter.

When the cleat 6 is not present, or is not engaged, as shown in FIG. 1, the catch 17 is in the raised position and its rear edge is in bearing engagement against the abutments 24. The hoop 10 is retained in a "preset" position, i.e, an open, retracted position.

When the cyclist wishes to attach the cleat 6 to the pedal 1, they engage the front nose 8 of the cleat under the rim 7 and push the rear part of the cleat, forming a cam, down into a free space situated to the rear of the platform 21 and in front of the hoop 10. The cyclist encounters no significant resistance to causing the cam to descend into this free space and pushing the catch 17 downward, because the force exerted by the leaf spring 22 is relatively weak.

The lowering of the catch 17 by virtue of rotation in the anticlockwise direction, as shown in FIG. 2, frees the hoop 10 which, because of the action of the flexing plate 15, is turned clockwise about the geometrical axis A. The transverse branch of the hoop 10 comes to cover and to be attached to a rear nose of the cleat 6. The shoe to the bottom of which this cleat 6 is fixed is then attached to the pedal.

The cleat 6 is engaged or disengaged by a movement of rotation of the foot and the cleat that causes the hoop 10 to be retracted until it releases the rear nose of the cleat.

When the cleat 6 separates from the pedal 1, with the hoop 10 in the open position, the catch 17 is raised by the action of the leaf spring 22 and its rear edge comes to cooperate with the abutments 24 to retain the hoop 10 in the open position shown in FIG. 1.

The hardness of the return action of the flexing blade 15 is adjusted by turning the rod 13.

The pedal is of simple and robust construction with a small number of parts, facilitating assembly, notably thanks to disposing the flexing blade 15 in simple bearing engagement at its ends and the rod 13 serving as a third bearing point.

The invention claimed is:

1. A bicycle pedal with automatic engagement and disengagement, including a body rotatable on a pedal axle with:
    a front abutment means adapted to cooperate with a conjugate abutment surface provided on a cleat fixed to the bottom of the sole of the shoe of the user;
    a retaining member rotatable about a geometrical axis (A) parallel to that of the pedal, adapted to be pressed against the cleat by a flexing element (B) to attach the cleat to the pedal, one end of the flexing element being immobilized against the body, the other end being in bearing engagement against the retaining, member,
    wherein an articulation axle of the retaining member comprises a rod that extends transversely under the flexing element bearing engagement on said articulation axle, the flexing element being flexed by bearing against said articulation axle between the one end bearing against the body and the other end rearing against the retaining member, and
    wherein the rod forming the articulation axle of the retaining member has in its median area, adapted to come to bear against the flexing element (B), flats distributed over its circumference and situated at different distances from the geometrical axis (A) of the rod, so that by rotation of the rod in bearings provided in the pedal body it is possible to adjust the hardness of the return action exerted by the flexing element (B).

2. The pedal according to claim 1, wherein bearing engagement against the pedal body and against the retaining member retains the flexing element (B).

3. The pedal according to claim 1, wherein the pedal body includes two rearwardly extending extensions bracketing the retaining member, the two extensions being separated by a free space.

4. The pedal according to claim 1, wherein the retaining member comprises a hoop having two radially oriented branches connected by a central part against which one end of the flexing element conies to bear.

5. The pedal according to claim 1, wherein the flexing element (B) comprises a flexing plate.

6. The pedal according to claim 5, wherein the flexing plate comprises a composite material.

7. The pedal according to claim 1, further including a catch adapted to retain the retaining member in an open position on disengagement of the cleat against the return action exerted by the flexing element (B) and to release this retaining member on engagement of the cleat.

8. The pedal according to claim 7, wherein the catch includes a leaf spring spring-loading it toward an open position.

9. The pedal according to claim 8, wherein the leaf spring is made of metal and is moulded into the plastic material catch.

10. The pedal according to claim 7, wherein the catch is the shape of a U having two radially oriented branches connected by a crossmember, with ends of the branches remote from the crossmember are provided with aligned outwardly oriented pins serving to articulate the catch to the pedal body.

* * * * *